(12) United States Patent
Ma et al.

(10) Patent No.: US 9,520,931 B2
(45) Date of Patent: Dec. 13, 2016

(54) SYSTEM AND METHOD FOR UNIFIED FEEDBACK IN A COMMUNICATION SYSTEM

(75) Inventors: Jianglei Ma, Ottawa (CA); Ming Jia, Ottawa (CA); Mohammadhadi Baligh, Kanata (CA); Yang Tang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 460 days.

(21) Appl. No.: 12/907,740

(22) Filed: Oct. 19, 2010

(65) Prior Publication Data

US 2011/0103287 A1    May 5, 2011

Related U.S. Application Data

(60) Provisional application No. 61/257,285, filed on Nov. 2, 2009.

(51) Int. Cl.
*H04B 7/06* (2006.01)
*H04B 7/02* (2006.01)

(52) U.S. Cl.
CPC .......... *H04B 7/0639* (2013.01); *H04B 7/024* (2013.01)

(58) Field of Classification Search
CPC ....... H04B 7/024; H04B 7/0626; H04B 7/063; H04B 7/0632; H04B 7/0639; H04L 5/0037; H04L 5/006; H04L 5/0023
USPC ....................................... 370/312
See application file for complete search history.

(56) References Cited

U.S. PATENT DOCUMENTS

| | | | |
|---|---|---|---|
| 2007/0171849 A1* | 7/2007 | Zhang et al. ................. | 370/310 |
| 2008/0032630 A1* | 2/2008 | Kim et al. ...................... | 455/45 |
| 2010/0027456 A1* | 2/2010 | Onggosanusi et al. ....... | 370/312 |
| 2010/0144334 A1* | 6/2010 | Gorokhov et al. ............ | 455/418 |
| 2011/0194593 A1* | 8/2011 | Geirhofer ............ | H04W 72/048 375/224 |
| 2014/0161093 A1* | 6/2014 | Hoshino ................ | H04B 7/024 370/329 |

FOREIGN PATENT DOCUMENTS

| | | |
|---|---|---|
| CN | 101373999 A | 2/2009 |
| CN | 101483873 A | 7/2009 |
| WO | WO2009/132143 | 10/2009 |
| WO | WO2011/050755 | 5/2011 |

OTHER PUBLICATIONS

Motorola. TSGRAN WG#57. R1-091948. May 8, 2009.*
3GPP TR36.814 (v0.4.1) Feb. 2009.*
Qualcomm Europe. 3GPP TSG-RAN WG1 #56bis. R1-091617. Mar. 27, 2009.*

(Continued)

*Primary Examiner* — Stephen J Clawson
(74) *Attorney, Agent, or Firm* — Slater Matsil, LLP

(57) ABSTRACT

In an embodiment, a method of operating a communication device includes determining a first coordinated multipoint (CoMP) mode, electronically receiving feedback from a user device in the uniform feedback format, and determining transmission parameters of the first CoMP mode. The first CoMP mode includes one of a plurality of CoMP modes, and each of the plurality of CoMP modes is configured to operate using a uniform feedback format.

34 Claims, 7 Drawing Sheets

(56) References Cited

OTHER PUBLICATIONS

CATT, "Analysis of CQI/PMI Feedback for Downlink CoMP," R1-090941, 3GPP TSG RAN WG1 meeting #56, Feb. 9-13, 2009, 4 pages, Athens, Greece.
Nortel, "Discussion and Link Level Simulation Results on LTE-A Downlink Multi-site MIMO Cooperation," R1-084465, 3GPP TSG-Ran Working Group 1 Meeting #55, Nov. 10-14, 2008, pp. 1-11, Prague, Czech Republic.
Qualcomm Europe, "TP for feedback in support of DL CoMP for LTE-A TR," R1-092284, 3GPP TSG-RAN WG1 #57, May 4-8, 2009, 4 pages, San Francisco, CA.
CATT, "Analysis of Feedback Signalling for Downlink CoMP," R1-091986, 3GPP TSG RAN WG1 meeting #57, May 4-8, 2009, 4 pages, San Francisco, CA.
Huawei, "Feedback Design Principles of Downlink CoMP," R1-092369, 3GPP TSG RAN WG1 meeting #57bis, Jun. 29-Jul. 3, 2009; 4 pages, Los Angeles, CA.
Huawei, "Discussion on Common Feedback Framework for DL CoMP," R1-093034, 3GPP TSG RAN WG1 meeting #58, Aug. 24-28, 2009, 4 pages, Shenzhen, CN.
Huawei, "Feedback overhead effects for MU-MIMO performance evaluation," R1-09xxxx, 3GPP TSG RAN WG1 meeting #58bis, Oct. 12-16, 2009, Miyazaki, JP.
ETRI, "Multi-cell PMI coordination for downlink CoMP," R1-091976, 3GPP TSG RAN WG1 Meeting #57, May 4-8, 2009, 4 pages, San Francisco, CA.
Dietz, Martin et al., "Spectral Band Replication, a novel approach in audio coding," Audio Engineering Society, Convention Paper 5553, Presented at the 112$^{th}$ Convention, May 10-13, 2002, 8 pages, Munich, DE.
Ekstrand, "Bandwidth Extension of Audio Signals by Spectral Band Replication," Proc. 1$^{st}$ IEEE Benelux Workshop on Midel based Processing and Coding of Audio (MPCA-2002), Nov. 15, 2002, 6 pages, Leuven, BE.
Chen, Juin-Hwey et al., "Adaptive Postfiltering for Quality Enhancement of Coded Speech," IEEE Transactions on Speech and Audio Processing, vol. 3, No. 1, 13 pages, Jan. 1995.
"Feedback in support of Downlink CoMP: General views," Discussion and Decision Agenda item 7.5, Qualcomm Europe, Oct. 12-16, 2009, pp. 1-7, 3GPP TSG-RAN WG1 #58bis R1-094217, Miyazaki, Japan.
"Downlink feedback framework for LTE-Advanced," Discussion and Decision Agenda item 7.5, Nokia Siemens Networks, Nokia, Oct. 12-16, 2009, 6 pages, 3GPP TSG RAN WG1 Meeting #58bis R1-093912, Miyazaki, Japan.
"Investigation on Quantization Scheme of Explicit Spatial Channel Feedback for CoMP Joint Transmission in LTE-Advanced," Discussion and Decision Agenga item 7.5, NTT DOCOMO, Oct. 12-16, 2009, pp. 1-8, 3GPP TSG RAN WG1 Meeting #58bis, R1-094244, Miyazaki, Japan.
"Discussion on CoMP with Implicit CQI Feedback," Discussion and Decision Agenda item 7.5, Samsung, Oct. 12-16, 2009, 6 pages, 3GPP TSG RAN WG1 Meeting #58bis, R1-094093, Miyazaki, Japan.
"3$^{rd}$ Generation Partnership Project: Technical Specification Group Radio Access Network; Evolved Universal Terrestrial Radio Access (E-URTA); Physical Channels and Modulation," Technical Specification, Release 8, May 2009, 83 pages, 3GPP TS 36.211, V8.7.0.
European Extended Search Report received in European Patent Application No. 10826118.1, dated Sep. 20, 2012, 8 pages.
International Search Report received in Patent Cooperation Treaty Application No. PCT/CN2010/078313, dated Feb. 10, 2011, 3 pages.
Written Opinion of the International Searching Authority received in Patent Cooperation Treaty Application No. PCT/CN2010/078313, dated Feb. 10, 2011, 6 pages.
Ding, Qing, et al., "Reputation Based Access Point Selection in 802.11 Network," IEEE Third 2008 International Conference on Convergence and Hybrid Information Technology, 2008, pp. 324-329.
ETRI, "UE Feedback for Downlink CoMP," 3GPP TSG Ran WG1 Meeting #57 bis, R1-092304, Los Angeles, CA, Jun. 29-Jul. 3, 2009, 6 pages.
CMCC, "SRS Feedback Mechanism Based CoMP Schemes in TD-LTE-Advanced," 3GPP TSG-RAN WG1 #58, R1-093273, Shenzhen, China, Aug. 24-28, 2009, 8 pages.
Texas Instruments, "Advanced DL CoMP Schemes and Related Feedback Support," 3GPP TSG RAN WG1 58 bis, R1-093998, Miyazaki, Japan, Oct. 12-16, 2009, 2 pages.
Second Office Action received in Chinese Application No. 2010800496153 mailed Feb. 19, 2014 , 22 pages.
Samsung, "Discussion on CoMP with Implicit CQI Feedback," 3GPP TSG RAN WG1 Meeting #58bis, Miyazaki Japan, Oct. 12-16, 2009, R1-094093, 6 pages.
Qualcomm Europe, "Hierarchical Feedback in Support of Downlink CoMP Operation," R1-093110, 3GPP TSG-RAN WG1 #58, Aug. 24-28, 2009, 5 pages.
CHTTL, "Efficient UE Signaling in Support of DL CoMP," R1-093581, 3GPP TSG RAN WG1 Meeting #58, Aug. 24-28, 2009, 4 pages.
Qualcomm Europe, "CoMP email summary," R1-093720, 3GPP TSG-RAN WG1 #58, Aug. 24-28, 2009, 13 pages.
Alcatel-Lucent, Alcatel-Lucent Shanghai Bell, "Comparison of CSI Feedback Schemes," R1-093778, 3GPP TSG-RAN WG1 #58, Oct. 12-16, 2009, 10 pages.
Philips, "Re-Use of Single Cell Codebook Designs for CoMP," 3GPP TSG RAN WG1 Meeting #58bis, R1-093935, Oct. 12-16, 2009, 3 pages.

* cited by examiner

SYSTEM AND METHOD FOR UNIFIED FEEDBACK IN A COMMUNICATION SYSTEM

CROSS REFERENCE TO RELATED APPLICATIONS

This patent application claims priority to U.S. Provisional Application No. 61/257,285 filed on Nov. 2, 2009, entitled "Unified Feedback Scheme for DL CoMP," which application is incorporated by reference herein in its entirety.

TECHNICAL FIELD

The present invention relates generally to communication systems, and more particularly to a system and method for unified feedback in a communication system.

BACKGROUND

Wireless communication systems are widely used to provide voice and data services for multiple users using a variety of access terminals such as cellular telephones, laptop computers and various multimedia devices. Such communication systems can encompass local area networks, such as IEEE 802.11 networks, cellular telephone and/or mobile broadband networks. The communication systems can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP) including Long Term Evolution (LTE), IEEE 802.11 networks, and Evolution-Data Optimized EV-DO.

In the downlink channel (DL) of a wireless communication system, coordinated multipoint (CoMP) transmission schemes are used to enhance coverage. By using multiple transmitters in a system, and choosing among the multiple transmitters or jointly broadcasting among the multiple transmitters, coverage can be expanded and data rates can be increased over systems that relay on a single transmitter. In order to implement CoMP schemes, however, user devices or user equipment (UE) typically need to provide more feedback to the base station. Different CoMP schemes are suitable for different deployment scenarios, and, therefore, generally have different feedback requirements.

Supporting these different feedback schemes can come at a cost of extra system overhead. For example, channel feedback can be used to support CoMP transmission, but requires a very high feedback overhead. Furthermore, multiple implicit feedback schemes for different DL CoMP transmission schemes can be used, but require multiple feedback formats, which, in turn, require more system resources to implement.

SUMMARY OF THE INVENTION

In accordance with an embodiment, a method of operating a communication device includes determining a first coordinated multipoint (CoMP) mode, electronically receiving feedback from a user device in the uniform feedback format, and determining transmission parameters of the first CoMP mode. The first CoMP mode includes one of a plurality of CoMP modes, and each of the plurality of CoMP modes is configured to operate using a uniform feedback format.

In accordance with another embodiment, a communications device includes a transmitter, a receiver receiving feedback from a user device in a uniform feedback format, and a processor configured to determine a first transmission mode from a plurality of transmission modes, and determine transmission parameters of the first transmission mode based on the feedback. The first transmission mode comprises one of a plurality of transmission modes, and each of the plurality of transmission modes is configured to operate using the uniform feedback format.

In accordance with another embodiment, a communication device includes a receiver, a transmitter, and a processor coupled to the receiver and the transmitter. The processor is configured to operate the communication device in one of a plurality of operating modes, where the operating modes include a plurality of coordinated multipoint (CoMP) modes. In an embodiment, the processor is configured to generate a uniform feedback format for each of the CoMP modes.

In accordance with another embodiment, a method of operating a communication device includes operating the communication device in one of a plurality of operating modes, where the operating modes include a plurality of coordinated multipoint (CoMP) modes. The method further includes generating feedback using a uniform feedback format for each of the CoMP modes and transmitting the feedback to a user device at a transmitter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
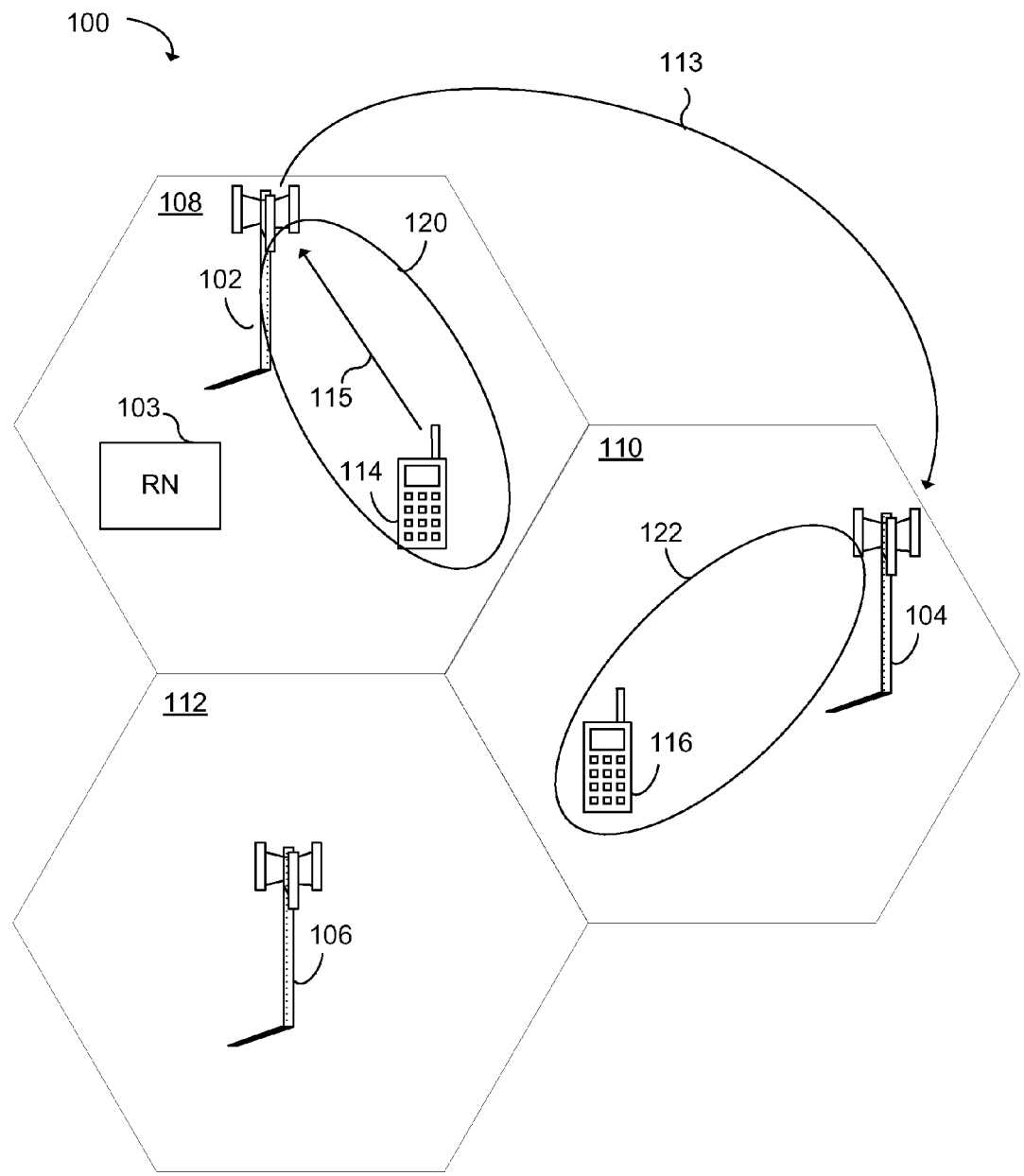
FIG. 1 illustrates a diagram of an embodiment mobile broadband system operating in a coordinated beam forming (CBF) mode.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a system and method for unified feedback in a communication system.

In embodiments, a unified implicit feedback scheme for DL CoMP is applied to different DL CoMP modes, including coordinated scheduling/beamforming, dynamic cell selection and coherent and non-coherent joint transmission. In some embodiments, the unified transmission scheme is further used in non-Comp transmission schemes. The unified implicit feedback scheme is also used in the context of a dynamic switch between different CoMP modes and between single-cell transition and CoMP transmission in further embodiments.

In an embodiment, the unified feedback format is an LTE rel-8 PMI based feedback format, which is used for DL CoMP transmission modes, a transparent DL transmission mode switch, and a hybrid DL CoMP implementation.

Compared with single site transmission, more feedback information is needed to enable CoMP modes, such as coordinated scheduling (CS), coordinated beam forming (CB), and joint transmission and dynamic cell selection (JP). Generally feedback falls into two categories: Implicit feedback and explicit feedback. Implicit feedback is based on the hypotheses of different transmission and/or reception processing. One example of implicit feedback is a precoding matrix indicator (PMI). In one embodiment, a user device or user equipment (UE) derives channel characteristics and selects a best precoder matrix from a list of precoder matrices. The PMI is a code taken from a code book that indicates the preferred precoder. Because only a code or index is sent, the UE does not have to transmit the entire channel information.

Explicit feedback, on the other hand, represents the channel as observed by the receiver without assuming transmission or receiver processing. Embodiments of the present invention use a PMI based implicit feedback scheme having a low feedback overhead that is backward compatible with the rel-8 LTE standard, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.7.0 (2009-05), which is incorporated herein by reference in its entirety. Furthermore, some embodiments use a uniform feedback channel format, such as PMI, for all CoMP modes. Some embodiments use a uniform feedback channel and differing amounts of feedback information within the feedback channel. For example transmission modes, such as coherent joint transmission (JT) require more feedback information than other modes, such as internal phase correction. Further discussion of CoMP communication techniques can be found in U.S. patent application Ser. No. 12/830,405 filed on Jul. 5, 2010, entitled "System and Method for Multi-Cell Joint Codebook Feedback in Wireless Communications Systems," while application is hereby incorporated herein by reference in its entirety. It should be appreciated that the uniform feedback format is not specifically limited to PMI feedback. In embodiments, the uniform feedback format can be a channel index, precoding index, or other representation that succinctly represent a channel. Furthermore, it should be appreciated that embodiments described herein are not limited to LTE systems, in that concepts of the described embodiments can be applied to non-LTE systems such as network systems having distributed antennas.

In one embodiment, a common PMI Feedback Format and overhead is used for Coordinated Beam Forming (CBF) and joint processing (JP). FIG. 1 illustrates a diagram of embodiment mobile broadband system 100 operating in a coordinated beam forming (CBF) mode. Mobile broadband system 100 has base station 102 in cell 108 that communicates with user device, mobile terminal or user equipment (UE) 114. Mobile broadband system 100 also has base station 104 in cell 110 that communicates with user device, mobile terminal or UE 116 and base station 106 in cell 112. While three base stations 102, 104 and 106 and two UEs 114 and 116 are shown for simplicity of illustration, multiple cells, UEs can be used and provided for in real systems. In further embodiments, repeater node RN 103 can also be in communication with base stations 102, 104 and/or 106, as well as participate in CoMP mode transmissions with one or more UEs. In some embodiments, for example, embodiments that operate on an LTE network, base stations 102, 104 and 106 are implemented by an enhanced node B (eNB). In alternative embodiments, other systems besides LTE can be used, for example, a network system with distributed antennas.

In an embodiment CBF mode, cell 108 acts as a serving cell for UE 114 and a cooperating cell for UE 116, and cell 110 acts as a serving cell for 116 and as a cooperating cell for UE 114. Base station 102 communicates with UE 114 with signal 120. UE 114, in turn transmits preferred PMI feedback 115 back to base station 102 and companion PMI feedback 113 to base station 104 via base station 102. In an embodiment, the PMI feedback is communicated from UE 114 to base station 102, then from base station 102 to base station 104 via an X2 signaling interface. In one embodiment, preferred PMI is the index corresponding to a preferred precoder as determined, for example, by the UE. In an embodiment, the companion PMI can be a worst interfering PMI or best interfering PMI. In an embodiment, cooperating cells use the companion PMI to tell the coordinating base station in the cooperating cell, for example, a precoding direction that should be avoided. This information can also be used by the coordinating base station with respect to scheduling decisions. In an embodiment, the PMI is formatted according to rel-8 of the LTE standard with scalable feedback. For example, in a non-coherent JT mode, N PMIs are reported, where N is the number of cells involved in the CoMP transmission. For each PMI report, a rel-8 single cell PMI feedback channel is used in one embodiment. Alternatively, other PMI formats besides LTE rel-8, or other feedback formats.

Figure 2:
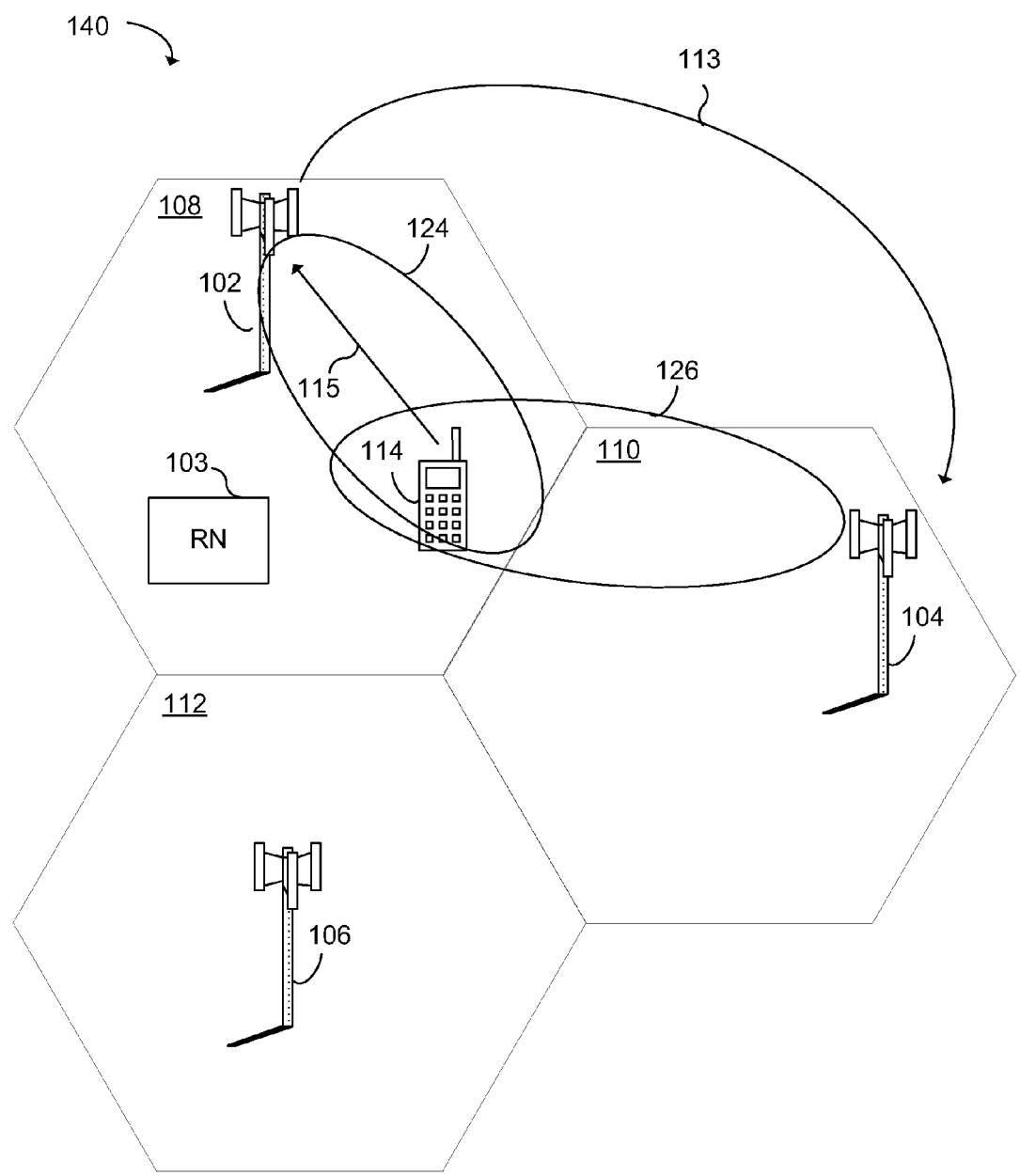
FIG. 2 illustrates a diagram of an embodiment mobile broadband system operating in a joint processing (JP) mode.

FIG. 2 illustrates a diagram of embodiment mobile broadband system 140 operating in a joint processing (JP) mode. Here, both base station 102 of cell 108 and base station 104 of cell 110 communicate with UE 114 via signals 124 and 126, respectively. UE 114 transmits PMIs 115 to base station 102 and PMI 113 to base stations 104 via base station 102 using, for example, an X2 signaling interface. In further embodiments, other interfaces between the base stations can be used. In embodiments where the JP mode is a non-coherent joint transmission (JT) mode, UE 114 transmits preferred PMIs to base station 102 and to base station 104 via base station 102. In embodiments, where the JT mode is a coherent transmission mode, the UE transmits two PMIs to each base station, namely a joint PMI for the combined channel and a PMI for coherent channel combining.

In one embodiment, the UE transmits the PMIs directly to the base station of the serving cell, and indirectly to the coordinating cell via the service base station using, for example, an X2 signaling interface. In one embodiment the PMI for coherent channel combining is derived according to:

$$G_{unified} = (H_1 + H_2 F_2^{(N_T,L)}) Q^{(L)}$$

where $H_1$ is the channel matrix of the serving cell, $H_2$ is a channel matrix of the coordinating cell, $F_2$ is a matrix selected from a codebook to constructively combine the channel $H_1$ and $H_2$, Q is a preferred PMI for the combined channel that is selected from a codebook, $N_{T,L}$ is a number of transmit antennas from the coordinating cell, and L is the number of layers transmitted for the combined channel. In an embodiment, $F_2$ is a combined matrix selected from the LTE rel-8 codebook and Q is a preferred PMI selected from the LTE rel-8 codebook. Table 1 describes the LTE rel-8 codebook for two antenna ports, and Table 2 describes the LTE rel-8 codebook for four antenna ports. The quantity $W_n^{\{s\}}$ denotes the matrix defined by the columns given by the set $\{s\}$ from the expression $W_n = I - 2 u_n u_n^H / u_n^H u_n$ where I is the 4×4 identity matrix and the vector $u_n$ is given by Table 2. Alternatively, other codebooks according to other systems can be used.

TABLE 1

Codebook for transmission on antenna ports {0,1}.

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

TABLE 2

Codebook for transmission on antenna ports {0, 1, 2, 3}

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In an embodiment, the PMI is formatted according to rel-8 of the LTE standard with a scalable feedback overhead. For example, in a non-coherent JT mode, N PMIs are reported, where N is the number of cells involved in the CoMP transmission. For each PMI report, a rel-8 single cell PMI feedback channel is used in one embodiment. Alternatively, other PMI formats, or other feedback formats, for example, additional interface information, can be used.

Figure 3A:
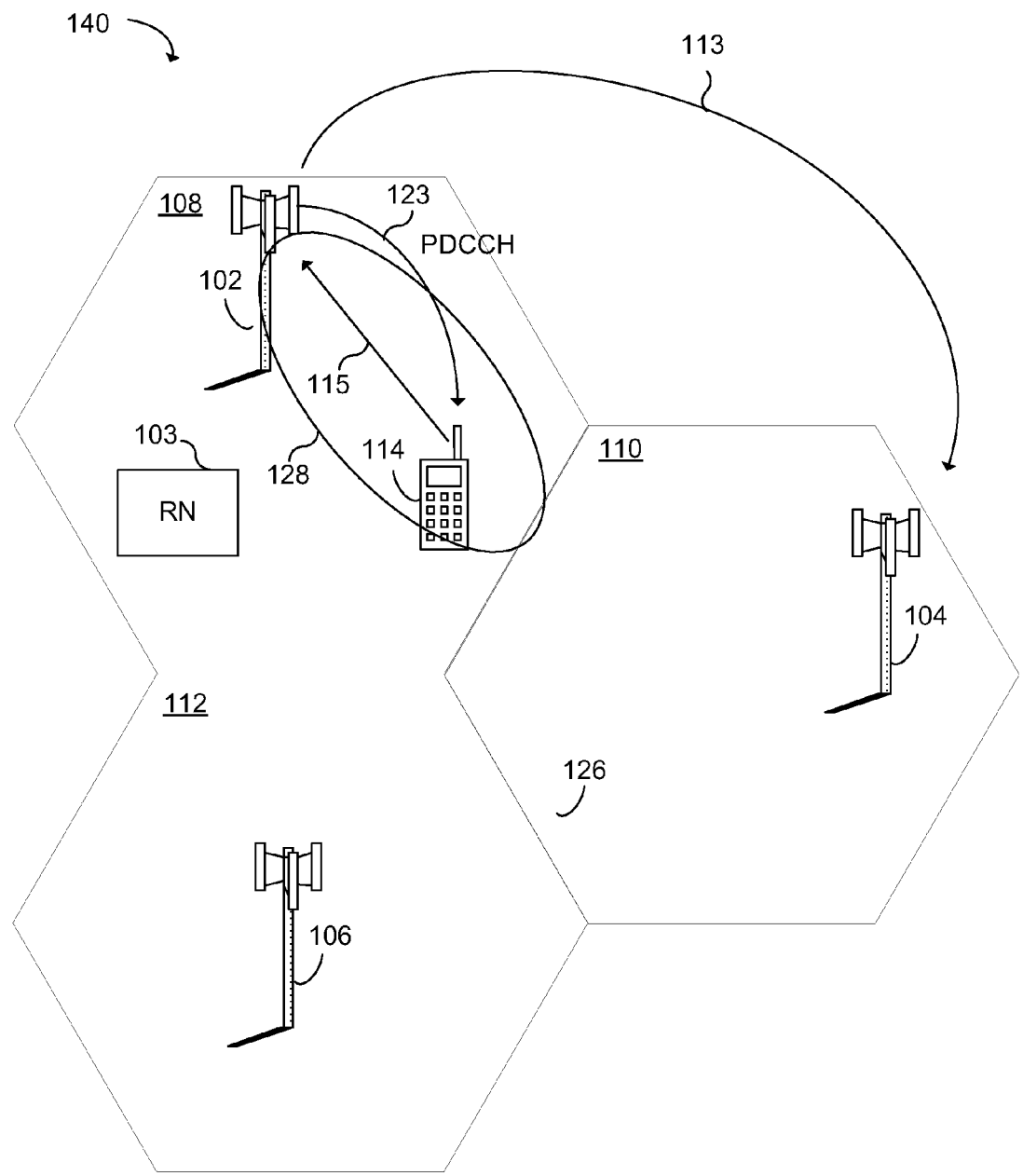
FIGS. 3a and 3b illustrate a diagrams of an embodiment mobile broadband system operating in a dynamic cell selection (DCS) mode.
Figure 3B:
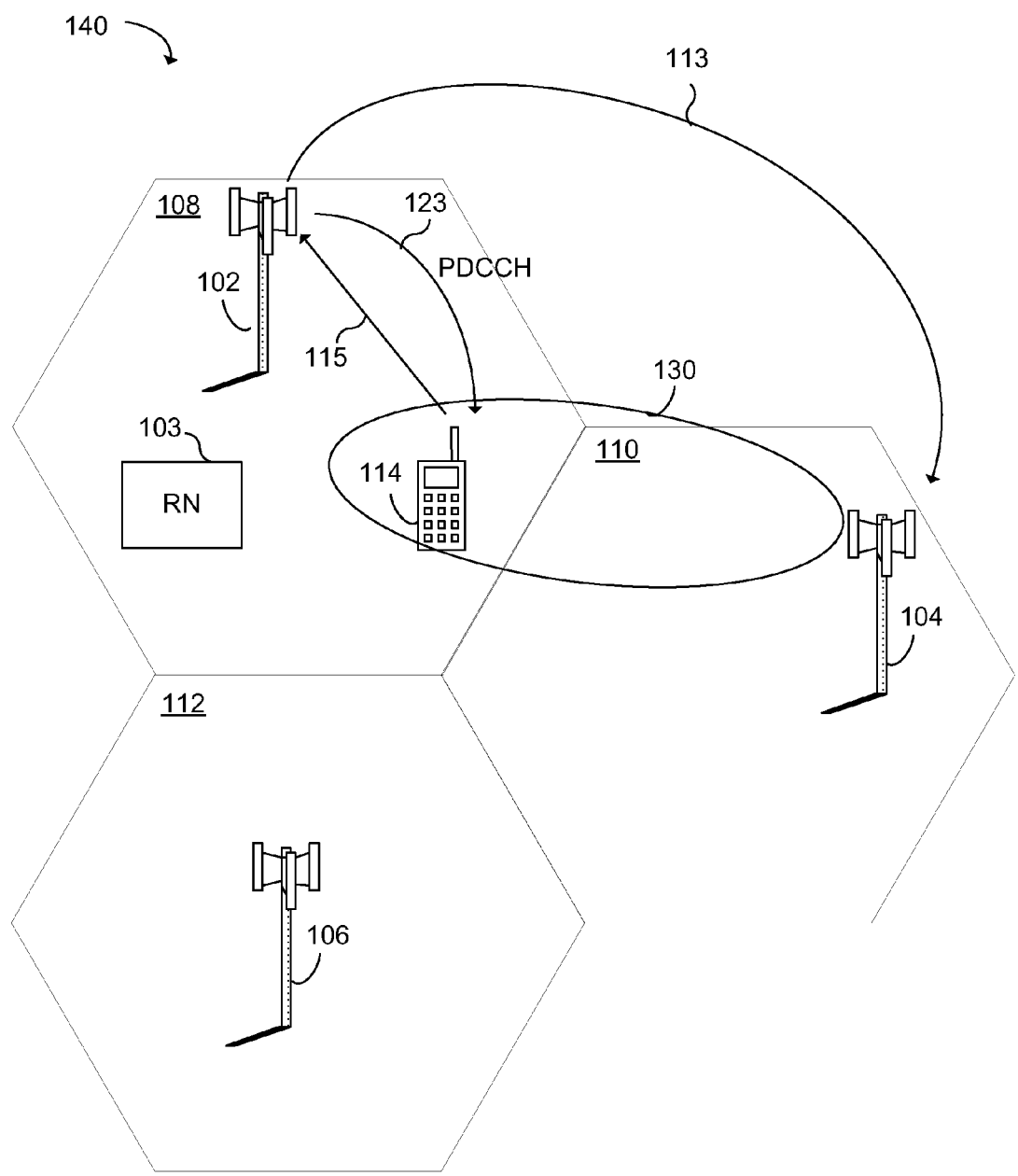

FIGS. 3a and 3b illustrate diagrams of embodiment mobile broadband system 140 operating in a dynamic cell selection (DCS) mode.

In a DCS embodiment, the UE transmits PMIs to both the serving cell and the cooperating cell and receives physical downlink control channel (PDCCH) from the serving cell. Transmission of the physical downlink shared channel (PDSCH), however, is switched between the serving cell and the cooperating cell depending on signal conditions and a selection algorithm. For example, in one embodiment, when the serving cell has a stronger signal, the serving cell is selected to transmit the PDSCH. On the other hand, when the cooperating cell has a stronger signal, the cooperating cell is selected to transmit the PDSCH.

FIGS. 3a and 3b illustrate diagrams of embodiment mobile broadband system 140 operating in a dynamic cell selection (DCS) mode. Here, UE 114 transmits PMI 115 to base station 102 in serving cell 108 and PMI 113 to base station 104 in cooperating cell 110. In the illustrated embodiment, UE 114 transmits PMI 113 to base station 102 of serving cell 108, which then sends PMI 113 to base station 104 of cooperating cell 110 via an interface, such as an X2 signaling interface. In further embodiments, other interfaces can be used. Base station 102 in serving cell transmits control information, for example, a PDCCH 128 to UE 114. In FIG. 3a, base station 102 of serving cell 108 transmits PDSCH 128 to UE 114. In one embodiment, base station 102 of serving cell 108 maintains the PDCCH with UE 114, while the PDSCH is changed between the serving cell and one or more cooperating cells. In FIG. 3b, base station 104 in cooperating cell 110 transmits PDSCH 130 to UE 114 and receives PDCCH 123 from base station 102 in serving cell 108.

In an embodiment, multi-user multiple-input multiple output (MU-MIMO) is applied together with DL CoMP. For example, MU-MIMO is combined with CBF and non-coherent JT CoMP schemes such that collaborated cells perform MU-MIMO paring based on the companion PMIs. In one embodiment, reduced transmit power is used to minimize inter-user interference. In a further embodiment, the serving cell performs MU-MIMO paring based on the preferred PMI.

In an embodiment, the transmit power of the serving cell and the coordinating cell to co-paired UEs can be reduced when MU-MIMO is implemented together with CBF. Here, the collaborated cells can perform MU-MIMO pairing considering companion PMIs and reduced transmit power can be used. Optionally, the serving cell can perform MU-MIMO paring based on the preferred PMI, and may use the reduced transmit power.

In another embodiment, MU-MIMO is combined with coherent JT such that the serving cell determines the companion MU-MIMO PMI based on the reported joint PMI. Here, the collaborated cells determine the companion MU-MIMO PMI based on the reported joint PMI and channel combining PMI. In a further embodiment, MU-MIMO is combined with DCS such that the silent cell can serves other UE while taking into consideration the interference avoidance based on the PMI reported to the silent cell.

In an embodiment that uses a correlated antenna configuration, the base station applies DL covariance information to improve the unified feedback scheme based DL CoMP performance. In one embodiment, the DL covariance is obtained at the base station based uplink channel measurement feedback from a UE.

Figure 4:
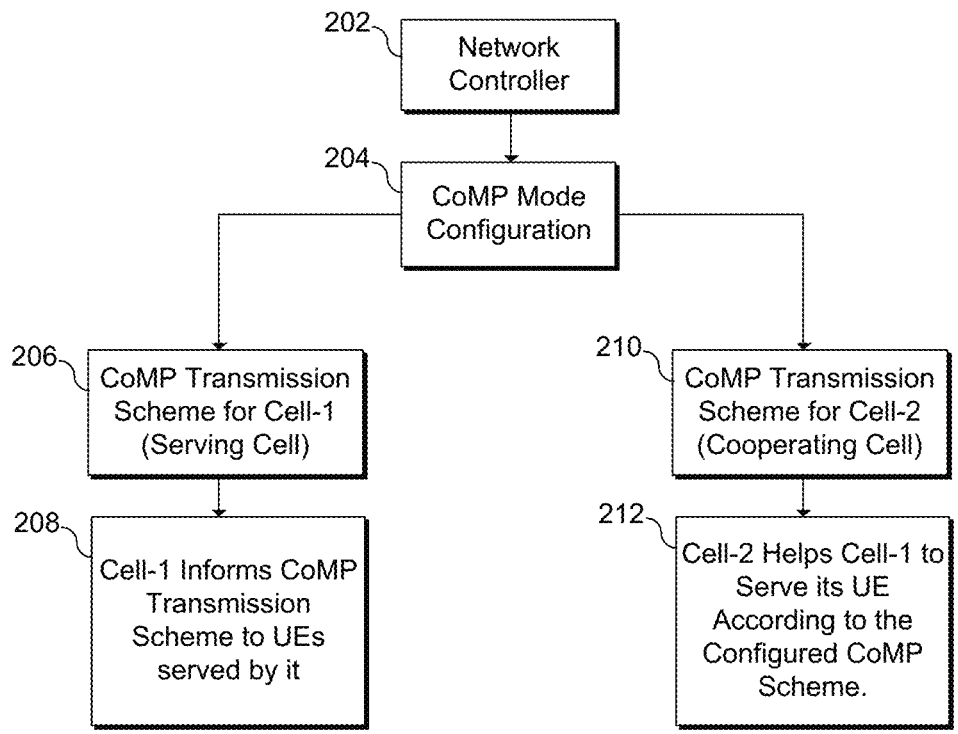
FIG. 4 illustrates an embodiment CoMP mode configuration method.

FIG. 4 illustrates a block diagram of CoMP Transmission Mode Switch. In an embodiment, a CoMP mode transmission switch is used to determine and switch between different CoMP and non-CoMP transmission modes. In one embodiment, the CoMP transmission mode switch is implemented by a processor in a base station or eNB. In other embodiments, the CoMP transmission switch can reside on a base station or a centralized controller.

In one embodiment network controller 202 configures CoMP mode configuration 204 using a semi-static adaptation based on operation scenarios such as, but limited to, backhaul capability, traffic load, antenna configuration, delay sensitivity of the data to be transmitted and network loading. In some embodiments, the determined CoMP mode is broadcast to UEs directly via serving and/or cooperating cells. For example, the determined CoMP transmission scheme is set in serving cell (block 206), which then informs UEs served by the serving cell of the CoMP transmission mode (block 208). In an embodiment, the UEs are informed via system information blocks (SIB). Likewise, the determined CoMP transmission scheme is set in the cooperating cell (block 210) such the cooperating cell assists the serving cell to serve the UEs according to the selected CoMP transmission scheme (block 212).

In a further embodiment, a CoMP slow mode adaptation is performed by using higher layer signaling to inform UE the change of the CoMP transmission mode. In one such embodiment, the UE understands the feedback mode based on the signaled CoMP mode. In one embodiment, the type of feedback that needs to be transmitted by the UE is predefined according to the CoMP transmission mode. Once the UE knows the CoMP transmission mode, the UE transmits the predefined feedback type.

In a further embodiment, a CoMP fast mode adaptation is performed such the mode is transparent to the UE. In one embodiment, coherent JT feedback format is used as a baseline feedback scheme for all CoMP transmission modes. In such an embodiment, individual cell based PMIs, which are required by other CoMP modes, can be obtained by using the preferred PMI Q of the coherently combined channel for the serving cell PMI, and combined matrix FQ for the companion PMI for the coordinating cell. In one embodiment, Q and FQ are used as defined in rel-8 of the LTE specification. For example, if the CoMP mode switch selects a CBF mode, the Q is used for the preferred PMI for the serving cell and FQ is used for the companion PMI in the coordinating cell. Using a fast CoMP mode adaptation, the system can switch between CoMP modes quickly without having to wait for CoMP transmission mode change information to propagate from the serving cell to all of the UEs.

Figure 5:
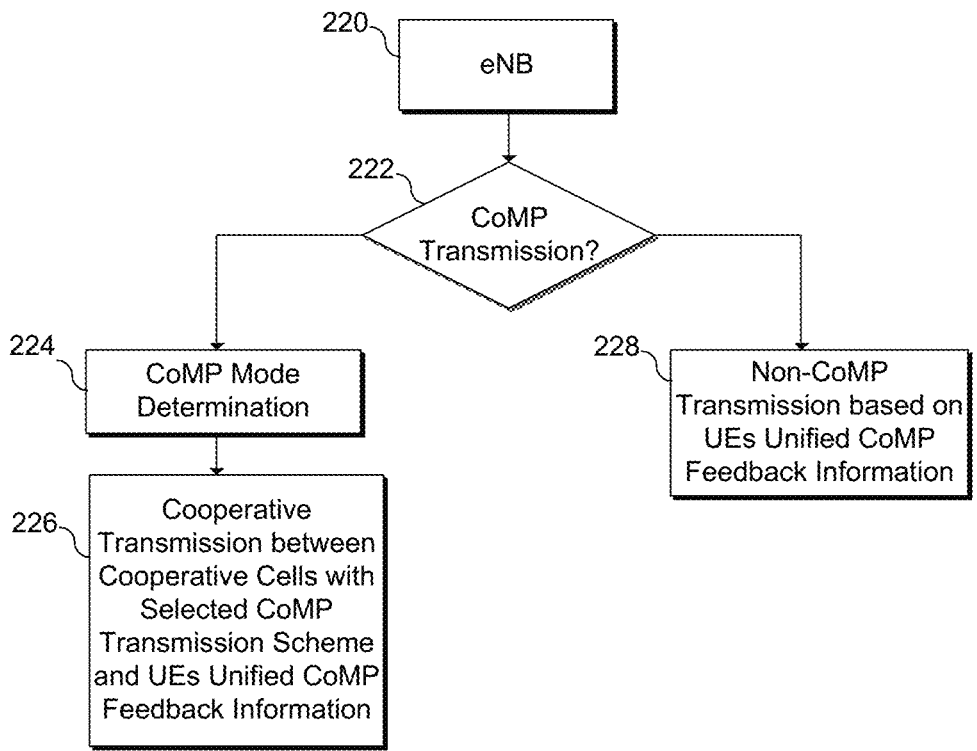
FIG. 5 illustrates a further embodiment CoMP mode configuration method.

FIG. 5 illustrates an embodiment fast CoMP mode adaptation method. In an embodiment, base station 220 determines whether a CoMP transmission is made according to a scheduling decision (block 222). In one embodiment, the base station 220 is an eNB. Alternatively, base station 220 can be another type of base station depending on the system and its specifications. If it is determined that CoMP transmission is being used, the particular CoMP mode is determined (block 224). In an embodiment, factors such as backhaul capability, traffic load, antenna configuration, delay sensitivity of the data to be transmitted and network loading are used to determine whether CoMP should be applied and to select the CoMP mode. Next, cooperative transmission between cooperative cells using the selected CoMP transmission mode is performed (block 226). In an embodiment, a unified feedback scheme, for example PMI feedback, is used for UE feedback. Alternatively, other unified feedback schemes can be used. If it is determined that a non-CoMP feedback scheme is being used, non-CoMP transmission is performed based on the UE's unified CoMP feedback information (block 228). For example, in one embodiment, Q is used as the precoder by the serving cell for non-CoMP transmission.

Advantages of embodiments using a CoMP switch include network flexibility, a mechanism to optimize overall system performance, a better trade off between cell capacity and cell coverage, and more scheduling flexibility to reduce the loss of the scheduling gain. Furthermore, with a unified feedback scheme, the dynamical CoMP mode switch becomes simpler to implement because, in some embodiments, scheduling can be optimized and there is no need to change the PMI feedback format. All that is changed, in an embodiment, is the PMI search approach. For example, in a non-CoMP mode, the preferred PMI is used for the serving cell, while in a CBF mode, the preferred PMI is used for the severing cell and the companion PMI is used for the cooperating cells. In a coherent JT mode, joint PMI is used, while in a non-coherent JT and fast cell selection mode, preferred PMIs are used for the serving cell and the cooperating cells.

In an embodiment, a communications system is operated using a mixed CBF and JP techniques, where CBF is used for inter-eNB CoMP and JP is used for intra-eNB CoMP. For the intra-eNB cells, JP feedback is used, and for inter-eNB cells, CBF feedback is used. In one embodiment, intra-eNB cells are distinguished from inter-eNB cells using an implicit method based on UE measurement. For example, a cell with no timing offset and a low inter-cell phase change rate can be considered as a cell from the same eNB. In a further embodiment, intra-eNB cells are distinguished from inter-eNB cells using an implicit method based on the cell ID and on cell group planning. For example, two cells belonging to the same group but having different cells would have the same group ID but different cell IDs. In a yet a further embodiment, intra-eNB cells are distinguished from inter-eNB cells using an explicit method based on signaling. Here, the network broadcasts the cell ID information.

Advantages of using an embodiment mixed CBF/JP transmission scheme include the ability to optimize DL CoMP performance for system without having a fast high capacity backhaul and the ability to simplify the coordination transmission between cooperative cells. For example, a fast, high capacity backhaul may not be available between eNBs in order to enable a JP mode between eNBs, however, JP between cells of the same eNB may be more practical in some embodiments.

Figure 6:
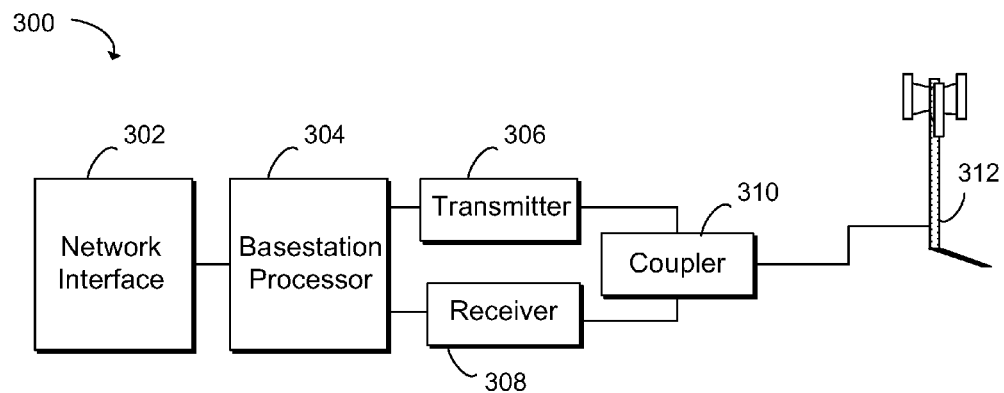
FIG. 6 illustrates an embodiment base station.

A block diagram of an embodiment base station 300 is illustrated in FIG. 6. Base station 300 has base station processor 304 coupled to transmitter 306 and receiver 308, and network interface 302. Transmitter 306 and receiver 308 are coupled to antenna 312 via coupler 310. Base station processor 304 executes embodiment methods and algorithms. For example, Base station processor 304 can implement a CoMP mode switch, receive feedback from UEs using a uniform feedback format, and implement mixed mode CoMP transmission schemes in some embodiments. In an embodiment, base station 300 is configured to operate in a LTE network using an OFDMA downlink channel divided into multiple subbands and using single carrier FDMA in the uplink. In alternative embodiments, other systems, network types and transmission schemes can be used, for example, 1×EV-DO, IEEE 802.11, IEEE 802.15 and IEEE 802.16. In alternative embodiments, base station 300 can have multiple transmitters, receivers and antennas (not shown) to support MIMO operation.

Figure 7:
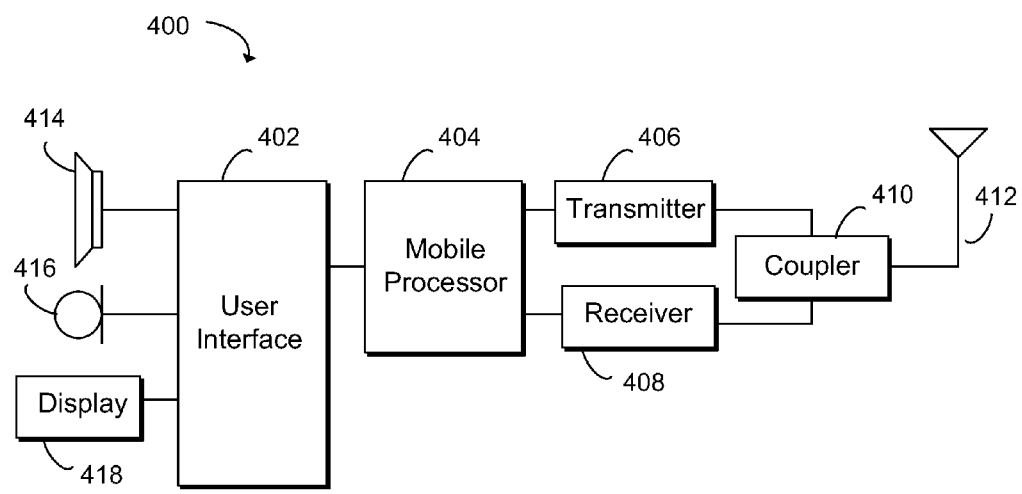
FIG. 7 illustrates an embodiment user device.

A block diagram of embodiment user device or UE 400 is illustrated in FIG. 7. User device 400 can be, for example, a cellular telephone or other mobile communication device, such as a computer or network enabled peripheral. Alternatively, user device 400 can be a non-mobile device, such as a desktop computer with wireless network connectivity. User device 400 has mobile processor 404, transmitter 406 and receiver 408, which are coupled to antenna 412 via coupler 410. User interface 402 is coupled to mobile processor 404 and provides interfaces to loudspeaker 414, microphone 416 and display 418, for example. Alternatively, user device 400 may have a different configuration with respect to user interface 402, or user interface 402 may be omitted entirely. In embodiment, user device 400 is configured to operate according to embodiment algorithms. For example, user device can be configured to transmits feedback according to a uniform format, such as PMI, and operate according to various CoMP and non-CoMP transmission schemes In alternative embodiments, user device 400 can have multiple transmitters, receivers and antennas (not shown) to support MIMO operation.

Figure 8:
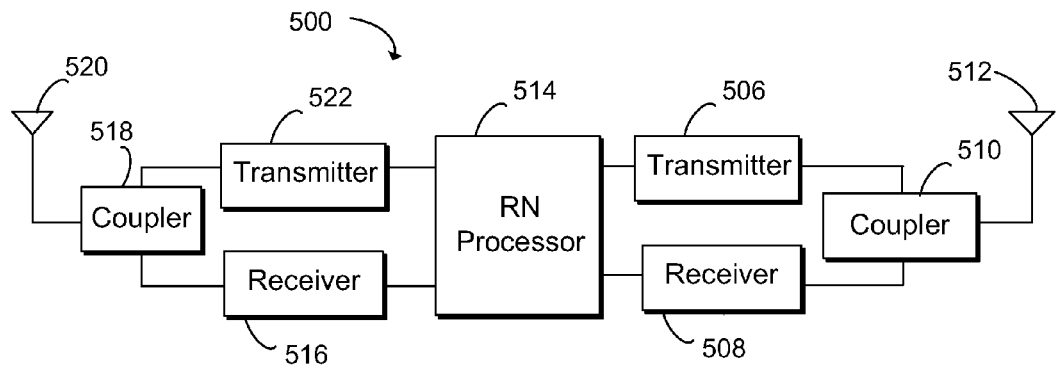
FIG. 8 illustrates an embodiment repeater node.

A block diagram of an embodiment relay node 500 is shown in FIG. 8. Relay node 500 has donor antenna 520, which transmits to and from the base station and is coupled to coupler 518, transmitter 522 and receiver 516. Service antenna 512, which transmits to and receives signals from user devices is coupled to coupler 510, transmitter 506 and receiver 508. RN processor 514, which is coupled to both the donor and service signal paths, controls the operation of relay node and implements embodiment algorithms described herein. For example, RN 400 can work with eNB 300 (FIG. 6) to implement CoMP transmission modes, receive UE feedback in a uniform format, and implement mixed mode CoMP transmission schemes in some embodiments. In an embodiment of the present invention, relay node 500 is configured to operate in a LTE network using an OFDMA downlink channel divided into multiple subbands and using single carrier FDMA in the uplink. In alternative embodiments, other systems, network types and transmission schemes can be used.

Figure 9:
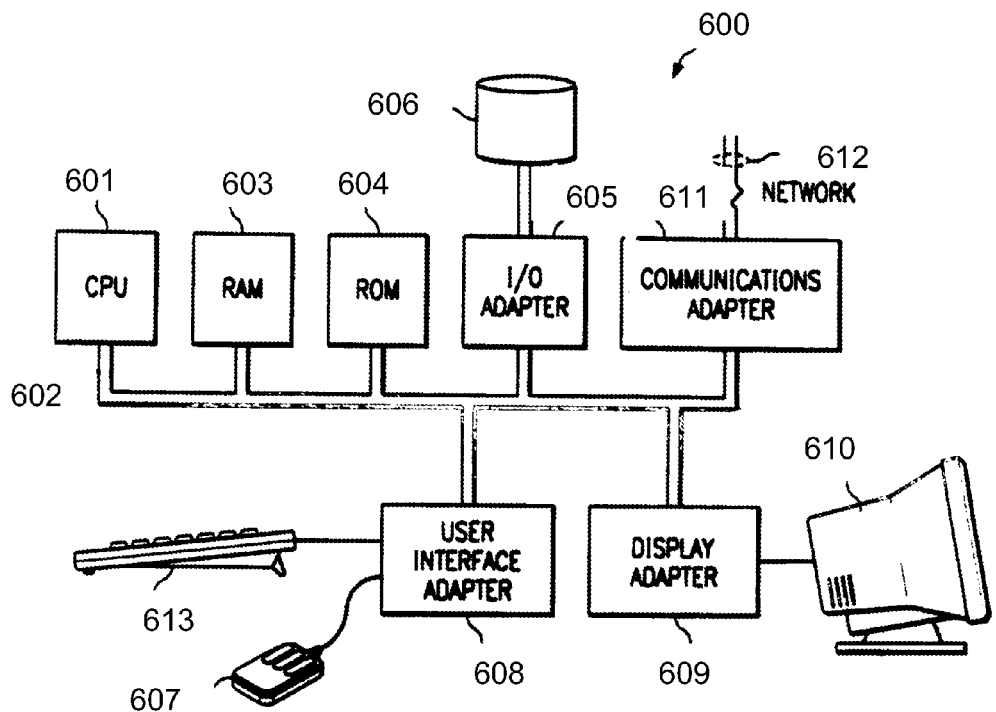
FIG. 9 illustrates an embodiment processing system used to implement embodiment algorithms.

FIG. 9 illustrates computer system 600 adapted to use embodiments of the present invention, e.g., storing and/or executing software associated with the embodiments. Central processing unit (CPU) 601 is coupled to system bus 602. CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 704 is also coupled to bus 602, which may be PROM, EPROM, or EEPROM. RAM 603 and ROM 604 hold user and system data and programs as is well known in the art.

Bus 602 is also coupled to input/output (I/O) adapter 605, communications adapter 611, user interface 608, and display adaptor 609. The I/O adapter 605 connects storage devices 606, such as one or more of a hard drive, a CD drive, a floppy disk drive, a tape drive, to computer system 600. Communications adapter 611 is configured to interface with network 612 The I/O adapter 605 is also connected to a printer (not shown), which would allow the system to print paper copies of information such as documents, photographs, articles, and the like. Note that the printer may be a printer, e.g., dot matrix, laser, and the like, a fax machine, scanner, or a copier machine. User interface adaptor is coupled to keyboard 613 and mouse 607, as well as other devices. Display adapter, which can be a display card in some embodiments, is connected to display device 610. Display device 610 can be a CRT, flat panel display, or other type of display device.

In an embodiment, a method of operating a communication device includes determining a first coordinated multi-point (CoMP) mode, electronically receiving feedback from a user device in the uniform feedback format, and determining transmission parameters of the first CoMP mode. The first CoMP mode includes one of a plurality of CoMP modes, and each of the plurality of CoMP modes is configured to operate using a uniform feedback format.

In an embodiment, the uniform feedback format comprises a precoder matrix indicator (PMI) feedback format. In a further embodiment, the method further includes determining a non-CoMP mode, and electronically receiving feedback parameters from the user device in the uniform feedback format while operating in the non-CoMP mode.

In an embodiment, the first CoMP mode is a non-coherent joint transmission (JT) mode based on the determining the transmission parameters. The communication device supports a serving cell or a cooperating cell, the PMI feedback includes a preferred PMI, and the method further includes computing a precoder based on the feedback from the user device, precoding a transmission with the precoder, and transmitting the precoded transmission to the user device. In one embodiment, the communication device supports a serving cell or a cooperating cell. In a further embodiment, the communication device further applies a multi-user multi-input-multi-output (MU-MIMO) transmission scheme based on the feedback from the user device.

In a further embodiment, the method includes transmitting a command to the user device to broadcast feedback content according to a joint transmission (JT) scheme as a baseline feedback scheme, whereby the determined first CoMP mode is transparent to the user device. In another embodiment, the method includes using high layer signaling to inform the user device of the determined first CoMP mode.

In a further embodiment, the first CoMP mode is a coherent joint transmission (JT) mode based on determining the CoMP transmission mode. The communication device supports a serving cell or a cooperating cell, the PMI feedback comprises a joint PMI for a combined channel, and the method further includes computing a precoder based on the feedback from the user device, precoding a transmission with the precoder, and transmitting the precoded transmission to the user device. In one embodiment, the communication device further applies a multi-user multi-input-multi-output (MU-MIMO) transmission scheme based on the feedback from the user device, the communication device comprises a base station supporting a serving cell, the method further includes determining companion MU-MIMO PMI based on a reported joint PMI. In a further embodiment, the communications device comprises a base station supporting a collaborated cell, and the method further includes determining companion MU-MIMO PMI based on a reported joint PMI and based on a channel combining PMI.

In a further embodiment, the first CoMP mode is a coordinated beam forming (CBF) mode. In one embodiment, the communication device is a base station supporting a serving cell, the PMI feedback includes a preferred PMI, and the method further includes if it is determined that the serving cell is to transmit to the user device, computing a precoder based on the PMI feedback, precoding a transmission with the precoder, and transmitting the precoded transmission to the user device. Alternatively, communication device includes a base station supporting a cooperating cell communicating with a first user device, where the PMI feedback includes a companion PMI. In a further embodiment, the communication device further applies a multi-user multi-input-multi-output (MU-MIMO) transmission scheme based on the feedback from the user device.

In a further embodiment, the communication device further comprises a base station supporting a serving cell communicating with a second user device the method further comprises communicating with the second user device in a joint processing mode, communicating further comprising receiving PMI feedback from the second user device.

In an embodiment, the first CoMP mode is a dynamic cell selection mode (DCS) mode based on the determining. In one embodiment, the communication device further applies a multi-user multi-input-multi-output (MU-MIMO) transmission scheme based on the feedback from the user device. In a further embodiment, communication device supports a silent cell using the feedback from the user device to implement interference avoidance when transmitting to other user device. In a further embodiment, the communication device comprises a base station supporting serving cell, the PMI feedback comprises a preferred PMI, and the method further comprises, if it is determined that the serving cell is to transmit to the user device, computing a precoder based on the PMI feedback, precoding a transmission with the precoder, transmitting the precoded transmission to the user device. Alternatively, the communication device comprises a base station supporting a cooperating cell and the PMI feedback comprises a companion PMI.

In an embodiment, the feedback received from the user device in the first CoMP mode comprises different content from feedback received from the user device in a second CoMP mode. The second CoMP mode comprises a further one of the plurality of CoMP modes, and the feedback received from the user device in the second CoMP mode includes the uniform feedback format.

In an embodiment, a communications device includes a transmitter, a receiver receiving feedback from a user device in a uniform feedback format, and a processor configured to determine a first transmission mode from a plurality of transmission modes, and determine transmission parameters of the first transmission mode based on the feedback. The first transmission mode comprises one of a plurality of transmission modes, and each of the plurality of transmission modes is configured to operate using the uniform feedback format. In an embodiment, the plurality of transmission modes comprises a plurality of coordinated multi-point (CoMP) modes. In a further embodiment, the plurality of transmission modes further comprises at least one non-CoMP transmission mode.

In a number of embodiments, the uniform feedback format comprises a precoder matrix indicator (PMI) feedback format. For example, in one embodiment, one of the plurality of CoMP modes includes at least one of a coherent joint transmission (JT) mode, a non-coherent joint transmission (JT) mode, a coordinated beam forming (CBF) mode, and a dynamic cell selection (DCS) mode. In one embodiment, the communication device applies a multi-user multi-input-multi-output (MU-MIMO) transmission scheme based on the feedback from the user device. In an embodiment, the processor determines the CoMP mode based on operation scenarios. In one embodiment, the communications device broadcasts operation mode to at least one user device. In a further embodiment, the communication device transmits a command to the user device to broadcast feedback content according to a joint transmission (JT) scheme as a baseline feedback scheme, whereby the determined first transmission mode is transparent to the user device.

In an embodiment, a communication device includes a receiver, a transmitter, and a processor coupled to the receiver and the transmitter. The processor is configured to operate the communication device in one of a plurality of operating modes, where the operating modes include a plurality of coordinated multipoint (CoMP) modes. In an embodiment, the processor is configured to generate a uniform feedback format for each of the CoMP modes. In a further embodiment, the plurality of CoMP operating modes includes at least one of a coherent joint transmission (JT) mode a non-coherent joint transmission (JT) mode, a coordinated beam forming (CBF) mode, and a dynamic cell selection mode (DCS) mode. In an embodiment, the uniform feedback format comprises a precoder matrix indicator (PMI) feedback format. Also, in one embodiment, the communication device is further configured to operate in a non-CoMP mode using the uniform feedback format. In an embodiment, the processor generates different feedback in each of at least two of the plurality of operating modes.

In an embodiment, a method of operating a communication device includes operating the communication device in one of a plurality of operating modes, where the operating modes include a plurality of coordinated multipoint (CoMP) modes. The method further includes generating feedback using a uniform feedback format for each of the CoMP modes and transmitting the feedback to a user device at a transmitter. The uniform feedback format includes a precoder matrix indicator (PMI) feedback format. In one embodiment, the plurality of CoMP operating modes includes at least one of a coherent joint transmission (JT) mode, a non-coherent joint transmission (JT) mode, a coordinated beam forming (CBF) mode, and a dynamic cell selection mode (DCS) mode. In an embodiment, generating feedback includes generating different feedback in at least two of the plurality of operating modes. In one embodiment, the method further includes operating the communication device in a non-CoMP mode using the uniform feedback format.

In an embodiment, a method of operating a coordinated multipoint (CoMP) switch includes selecting a transmission mode. The transmission mode includes one of a plurality of transmission modes, and the plurality of transmission modes includes a plurality of coordinated multipoint (CoMP) modes. Each of the plurality of CoMP modes is configured to operate using a uniform feedback format, where the uniform format comprising a precoder matrix indicator (PMI) feedback format. In an embodiment, the method further includes electronically receiving feedback from user devices in the PMI feedback format. In one embodiment, the plurality of transmission modes comprises a non-CoMP transmission mode.

In an embodiment, the a method of operating a CoMP switch further includes performing a semi-static mode adaptation that includes selecting the transmission mode based on operation scenarios, and broadcasting the operation mode to at least one user device. In a further embodiment, the method includes performing a slow mode adaptation, performing slow mode adaptation that includes using higher layer signaling to inform at least one user device of the transmission mode. In yet a further embodiment, a fast mode adaptation is performed where the mode adaptation is transparent to the at least one user device. In an embodiment, JT coherent feedback is used as a baseline feedback scheme when coherent JT is supported by the system. In an embodiment, the plurality of CoMP transmission modes comprise at least one of a coherent joint transmission (JT) mode, a non-coherent joint transmission (JT) mode, a coordinated beam forming (CBF) mode and a dynamic cell selection mode (DCS) mode. In further embodiments, other modes can be used.

In an embodiment, a coordinated multipoint (CoMP) switch includes a transmission mode selector that selects one of a plurality of transmission modes, where the plurality of transmission modes includes a plurality of coordinated multipoint (CoMP) modes. Each of the plurality of CoMP modes is configured to operate using a uniform feedback format, where the uniform format includes a precoder matrix indicator (PMI) feedback format. The CoMP switch also includes a receiver for receiving feedback from user devices in the PMI feedback format. In one embodiment, the plurality of transmission modes includes a non-CoMP transmission mode. In a further embodiment, the plurality of CoMP transmission modes comprise a coherent joint transmission (JT) mode, a non-coherent joint transmission (JT) mode, a coordinated beam forming (CBF) mode, and a dynamic cell selection mode (DCS) mode. Alternatively, other CoMP and non-CoMP modes can be used.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a communication device, the method comprising:
   selecting one out of a plurality of coordinated multipoint (CoMP) transmission modes, wherein a uniform feedback format requires that only precoding matrix indicator (PMI) feedback parameters are reported for the selected CoMP transmission mode irrespective of which of the plurality of CoMP transmission modes is selected;
   receiving feedback from a user device in accordance with the uniform feedback format, wherein the feedback received from the user device includes the PMI feedback parameters for CoMP transmission while excluding other types of feedback parameters for CoMP transmission by virtue of the feedback being communicated in accordance with the uniform feedback format; and
   determining transmission parameters of the selected CoMP transmission mode.

2. The method of claim 1, wherein the uniform feedback format specifies that the same amount of PMI feedback information is reported irrespective of which CoMP transmission mode is selected.

3. The method of claim 2, wherein the selected CoMP transmission mode is a non-coherent joint transmission (JT) mode,
wherein the communication device supports a serving cell or a cooperating cell,
wherein the PMI feedback comprises a preferred PMI, and
wherein the method further comprises:
computing a precoder based on the feedback from the user device,
precoding a transmission with the precoder, and
transmitting the precoded transmission to the user device.

4. The method of claim 2, wherein the communication device further applies a multi-user multi-input-multi-output (MU-MIMO) transmission scheme in accordance with the feedback received from the user device.

5. The method of claim 2, wherein the selected CoMP transmission mode is a coherent joint transmission (JT) mode based on the determining,
wherein the communication device comprises a base station supporting a serving cell or a cooperating cell,
wherein the PMI feedback comprises a joint PMI for a combined channel and a PMI for coherent channel combining, and
wherein the method further comprises:
computing a precoder based on the feedback from the user device,
precoding a transmission with the precoder, and
transmitting the precoded transmission to the user device.

6. The method of claim 5, further comprising using high layer signaling to inform the user device of the selected CoMP transmission mode.

7. The method of claim 2, further comprising transmitting a command to the user device to broadcast feedback content according to a joint transmission (JT) scheme as a baseline feedback scheme, wherein the selected CoMP transmission mode is unknown by the user device.

8. The method of claim 2, wherein the selected CoMP transmission mode is a coordinated beam forming (CBF) mode.

9. The method of claim 8, wherein the communication device comprises a base station supporting a serving cell,
wherein the PMI feedback comprises a preferred PMI, and
wherein the method further comprises, if it is determined that the serving cell is to transmit to the user device, computing a precoder based on the PMI feedback, precoding a transmission with the precoder, and transmitting the precoded transmission to the user device.

10. The method of claim 8, wherein the communication device comprises a base station supporting a cooperating cell communicating with a first user device,
wherein the PMI feedback comprises a companion PMI, and
wherein the method further comprises, if it is determined that the cooperating cell is to transmit to the first user device, computing a precoder based on the PMI feedback, precoding a transmission with the precoder, and transmitting the precoded transmission to the first user device.

11. The method of claim 10, wherein the communication device further comprises a base station supporting a serving cell communicating with a second user device, and wherein the method further comprises communicating with the second user device in a joint processing mode, the communicating further comprising receiving PMI feedback from the second user device.

12. The method of claim 2, wherein the selected CoMP transmission mode is a dynamic cell selection (DCS) mode.

13. The method of claim 12, wherein the communication device comprises a base station supporting a serving cell,
wherein the PMI feedback comprises a preferred PMI, and
wherein the method further comprises, if it is determined that the serving cell is to transmit to the user device, computing a precoder based on the PMI feedback, precoding a transmission with the precoder, and transmitting the precoded transmission to the user device.

14. The method of claim 12, wherein the communication device comprises a base station supporting a cooperating cell,
wherein the PMI feedback comprises a companion PMI, and
wherein the method further comprises, if it is determined that the cooperating cell is to transmit to the user device, computing a precoder based on the PMI feedback, precoding a transmission with the precoder, and transmitting the precoded transmission to the user device.

15. The method of claim 1, wherein the uniform feedback format requires that only PMI feedback parameters are reported for each of the plurality of CoMP transmission modes.

16. The method of claim 1, further comprising:
determining a non-CoMP transmission mode; and
electronically receiving feedback parameters from the user device in accordance with the uniform feedback format while operating in the non-CoMP transmission mode.

17. A communications device comprising:
a transmitter;
a receiver configured to receive feedback from a user device in accordance with a uniform feedback format; and
a processor configured to:
select one of a plurality of coordinated multipoint (CoMP) transmission modes, wherein the uniform feedback format requires that only precoding matrix indicator (PMI) feedback parameters are reported for the selected CoMP transmission mode irrespective of which of the plurality of CoMP transmission modes is selected, and wherein the feedback received from the user device includes the PMI feedback parameters for CoMP transmission while excluding other types of feedback parameters for CoMP transmission by virtue of the feedback being communicated in accordance with the uniform feedback format; and
determine transmission parameters of the selected CoMP transmission mode in accordance with the feedback received from the user device.

18. The communications device of claim 17, wherein the uniform feedback format specifies that the same amount of precoder matrix indicator (PMI) feedback information is reported irrespective of which CoMP transmission mode is selected.

19. The communications device of claim 18, wherein the plurality of CoMP transmission modes comprises at least one of a coherent joint transmission (JT) mode, a non-coherent joint transmission (JT) mode, a coordinated beam forming (CBF) mode, and a dynamic cell selection mode (DCS) mode.

20. The communications device of claim 18, wherein the processor is configured to apply a multi-user multi-input-multi-output (MU-MIMO) transmission scheme in accordance with the feedback received from the user device.

21. The communications device of claim 17, wherein the processor selects the CoMP transmission mode in accordance with operation scenarios.

22. The communications device of claim 17, wherein the transmitter is configured to broadcast an indicator of the selected CoMP transmission mode to at least one user device.

23. The communications device of claim 22, wherein the transmitter is configured to transmit a command to the user device, the command instructing the user device to broadcast feedback content according to a joint transmission (JT) scheme as a baseline feedback scheme, and wherein the selected CoMP transmission mode is unknown by the user device.

24. The communications device of claim 17, wherein the uniform feedback format requires that only PMI feedback parameters are reported for each of the plurality of CoMP transmission modes.

25. A method comprising:
receiving, by a user device, an indication specifying that a coordinated multipoint (CoMP) communication mode will be used to communicate data to the user device, the CoMP communication mode being one of a plurality of CoMP communication modes; and
reporting, by the user device, feedback information in accordance with a uniform feedback format, wherein the uniform feedback format requires that only precoding matrix indicator (PMI) feedback parameters are reported for the CoMP communication mode specified by the indication irrespective of which of the plurality of CoMP communication modes is specified by the indication, and wherein the feedback information reported by the user device includes the PMI feedback parameters for CoMP transmission while excluding other types of feedback parameters for CoMP transmission by virtue of the feedback information being communicated in accordance with the uniform feedback format.

26. The method of claim 25, wherein the plurality of CoMP communication modes comprises at least one of a coherent joint transmission (JT) mode; a non-coherent joint transmission (JT) mode; a coordinated beam forming (CBF) mode; and a dynamic cell selection (DCS) mode.

27. The method of claim 25, further comprising:
receiving, by the user device, a second indication specifying a non-CoMP communication mode; and
generating, by the user device, feedback information for the non-CoMP communication mode in accordance with the uniform feedback format, wherein the uniform feedback format specifies that the same type and number of feedback parameters are reported for non-CoMP communication modes as are reported for CoMP communication modes.

28. The method of claim 25, wherein the uniform feedback format specifies that the same amount of precoder matrix indicator (PMI) feedback information is reported irrespective of which CoMP transmission mode is selected.

29. The method of claim 25, wherein the uniform feedback format requires that only PMI feedback parameters are reported for each of the plurality of CoMP transmission modes.

30. A user device comprising:
a processor; and
a computer readable storage medium storing programming for execution by the processor, the programming including instructions to:
receive an indication specifying that a coordinated multipoint (CoMP) communication mode will be used to communicate data to the user device, wherein the CoMP communication mode is one of a plurality of CoMP communication modes; and
report feedback information in accordance with a uniform feedback format, wherein the uniform feedback format requires that only precoding matrix indicator (PMI) feedback parameters are reported for the CoMP communication mode specified by the indication irrespective of which of the plurality of CoMP communication modes is specified by the indication, and wherein the feedback information reported by the user device includes the PMI feedback parameters for CoMP transmission while excluding other types of feedback parameters for CoMP transmission by virtue of the feedback information being communicated in accordance with the uniform feedback format.

31. The user device of claim 30, wherein the plurality of CoMP communication modes comprises at least one of a coherent joint transmission (JT) mode, a non-coherent joint transmission (JT) mode, a coordinated beam forming (CBF) mode, and a dynamic cell selection mode (DCS) mode.

32. The user device of claim 30, wherein the uniform feedback format specifies that the same amount of precoder matrix indicator (PMI) feedback information is reported irrespective of which CoMP transmission mode is selected.

33. The user device of claim 30, wherein the programming further includes instructions to:
receive a second indication specifying a non-CoMP communication mode; and
generate feedback information for the non-CoMP communication mode in accordance with the uniform feedback format, wherein the uniform feedback format specifies that the same type and number of feedback parameters are reported for non-CoMP communication modes as are reported for CoMP communication modes.

34. The user device of claim 30, wherein the uniform feedback format requires that only PMI feedback parameters are reported for each of the plurality of CoMP transmission modes.

* * * * *